Feb. 4, 1969   R. E. CAMPBELL   3,425,207
ROPE, STRAND OR THE LIKE
Filed April 24, 1967

United States Patent Office 3,425,207
Patented Feb. 4, 1969

3,425,207
ROPE, STRAND OR THE LIKE
Robert Edward Campbell, Doncaster, England, assignor to British Ropes Limited, Doncaster, Yorkshire, England, a British company
Filed Apr. 24, 1967, Ser. No. 633,252
U.S. Cl. 57—145                                    11 Claims
Int. Cl. D07b 1/06; D02g 3/36

ABSTRACT OF THE DISCLOSURE

A wire rope in which adjacent wires are separated by an elastomeric material which completely fills the interstices between the wires, and a method of forming such a rope by drawing a strand, formed from a mixture of filamentary components of metal and elastomer through a die.

---

This invention relates to rope, strand or the like. By strand is meant an elongated structure comprising two or more filamentary components helically twisted together; generally it will consist of one or more layers of filamentary components helically twisted around a straight filamentary component.

In its simplest form a strand comprises three or more wires, usually six, which are helically wound around the king wire, the pitch of the individual wire helices being referred to as the strand lay length.

A rope in general consists of two or more such strands helically twisted together, although larger strands, particularly of the locked coil variety, are frequently referred to as ropes. When a strand is used as a centre member for another larger strand or for a rope it is known as a strand core. When a rope is used as a core for another rope it is known as an independent wire rope core.

These definitions are in general used in the rope industry and more especially in that part of it dealing with steel wire ropes. Where the wires are made of other material than steel, such as for example copper or aluminum wires in the electrical industry, somewhat different terms may be used. "Cable" for example is another term which is comprehended within the definitions used in the present application.

Hitherto, at least in the steel wire rope industry, these terms have been used more especially in relation to forms of wire strand and wire rope in which by virtue of its method of manufacture adjacent wires are in contact with each other both within the layer and as regards the immediately adjacent wires in different layers.

Civil engineering and defence requirements, involving the use of steel wire ropes in industrial and marine environments, necessitate the provision of greatly extended periods during which they will remain immune to corrosive attack. An additional requisite is that the materials, and manufacturing techniques, employed shall provide lubrication for similar periods of time and, consequently, materially retard the onset of fatigue induction.

At the present time the methods most commonly employed to achieve the desired results are:

(1) An extruded sheath of a selected material to the surface of a core, strand, or rope.

(2) The impregnation of a core, strand, or rope, with a material which is initially in liquid form, and is subsequently caused to gel or solidify to the required degree.

(3) The employment of a combination of steel wire sizes to produce a core, strand, or rope construction in which the interstitial gaps are sufficiently large to permit permeation of the requisite elastomer in the molten, or semi-molten, condition.

(4) To produce, and maintain, a negative pressure at the point where the preferred material is being applied to the exterior of a pre-heated core, strand or rope.

These specific techniques, and variations within the scope of such techniques, whilst reasonably effective for some applications, possess certain fundamental deficiencies which are accentuated with increases in core, strand, or rope, diameter. They may be categorised as follows:

(a) Extruded sheathings of a major radial thickness, fail to adhere to the underlying core, strand, or rope, when made to traverse around pulleys or like devices, or when long lengths are suspended in the near vertical position for long periods. As a result, they exhibit the condition known as "Swaging" corrugation or "rucking," which ultimately leads to the sheathing bursting, or tearing, at indeterminate points along its length. Corrosive agents can then be sucked in by capillary attraction, and corrosive attack within the rope proceed undetected. Additionally, in respect of "running" ropes, distortion of the sheathing can result in the rope jamming in a pulley, or fairlead.

(b) Manufacturing processes which involve impregnation techniques have their limitations, because such methods do not provide an adequate film of elastomer at the points of contact between the component wires: this is an essential requirement when resistance to fatigue induction is to be maintained at an optimum. Furthermore, such techniques restrict the operation to the employment of a single elastomer.

(c) The employment of combined extrusion and impregnation techniques, based upon constructions employing differential wire sizes, are relatively difficult to control and give inconsistent results when long lengths are involved. In addition, it necessitates the employment of relatively unbalanced rope constructions which, in turn, can lead to a radical reduction of resistance to fatigue induction in those instances where the rope is subjected to dynamic loading. This method, also, suffers from a lack of ability to consistently maintain an adequate separation of the component wires at the points of contact.

(d) Various impregnation techniques including vacuum impregnation techniques, whilst theoretically attractive, are lacking in consistency in completely filling the internal voids, because the core, strand, or rope requires some form of lubrication when spinning, and this can result in severe blistering, or even rupture of the plastic due to the development of volatilisation and internal pressure.

In one aspect the present invention consists in a new form of wire rope, strand or core in which adjacent wires, in the same layer at least, are not in physical contact with each other but are separated by an elastomeric material which completely fills the interstices between the wires.

In one such new form of wire, rope, strand or core the adjacent wires in different layers are also separated by an elastomeric material.

The chemical stability and physical characteristics of a number of elastomeric materials, especially those falling within the generic category of thermoplastics, have proved to be admirably suited for the purposes of the invention. Examples are polymers and co-polymers of polyethylene; olefines (polypropylene); polyethylene terephthalate; polyamides (nylon) and polyvinyl chloride. In addition, it has been found possible to use extended filaments of a mixture of certain of these materials e.g. polypropylene/polyethylene of ratio 80:20 to 20:80, 40:60 being preferred.

The invention may be carried out with the selected elastomeric filament or filament in the non orientated condition, but varying degrees of orientation right up to the complete state have proved advantageous as the diameter of the filament increases. Provisionally the advantage is in the increased tensile strength which consists in the forming operation.

In another aspect the invention consists in a method in which a strand is first formed from a mixture of metal filamentary components and filamentary components of elastomer, and the strand is then drawn through a sizing or compacting means such as a die, under conditions of temperature, die—or the like—bore and area, and any necessary tension such that the interstitial spaces between the filamentary components are filled by plastic flow of the elastomer.

The general geometric configuration of the metal filamentary components in the cross-section will be retained, although it is envisaged that radial distances from the centre of the strand may be reduced.

If desired it may be arranged that the flow of elastomer may provide a sheath around the strand continuous with the interior elastomer; alternatively, an elastomeric sheath may be subsequently applied bonding to the interior elastomer.

Conveniently the filamentary components of elastomer may have a wire running therethrough.

Conveniently a strand may be formed of, say a central king wire sheathed with an elastomer around which a layer of wires are helically wound in spaced apart positions, the strand being then passed through the die or other sizing or compacting means to cause the elastomer to flow between and around the wires in the layer of wires.

This process may be repeated as many times as desired, using the thus formed strand, provided that it is sheathed with elastomer, as the king wire for a further layer of wires helically wound therearound in spaced apart positions.

Conventional stranding machines may be used for forming the strands suitably modified to lay the wires around the king wire in spaced positions.

A further variation of the method of stranding according to the invention is to use alternate filaments of wire and of synthetic elastomer in each layer (or cover) in the usual stranding process.

The strands may then be compacted to cause the flow of the elastomer filaments to fill the interstices between the wires.

Conveniently this can be done layer by layer.

If desired when forming a strand of locked coil construction the elastomer filaments may be of half lock section.

The methods of the invention are capable of producing a strand which may be employed as such, or subsequently used in conjunction with other such strands to form a rope core, or a complete rope.

Strands produced by this method can also be closed into rope cores, or complete ropes, by orthodox rope-making techniques.

The methods are such that they are an integral part of a normal stranding operation, completely filling the internal voids with any thermoplastic, or thermosetting elastomer, capable of deformation when subjected to heat and pressure.

In another aspect the invention consists in apparatus for carrying out the method of the invention and for producing the articles of the invention.

The apparatus required to carry out the invention appertaining, in essence, to that of conventional stranding with the addition of certain apparatus at, and beyond, the forming point.

For convenience, the description of the complete apparatus is based upon a tubular strander, although other machine designs are equally applicable.

The invention will be further described with reference to the accompanying drawings.

Figure 1:
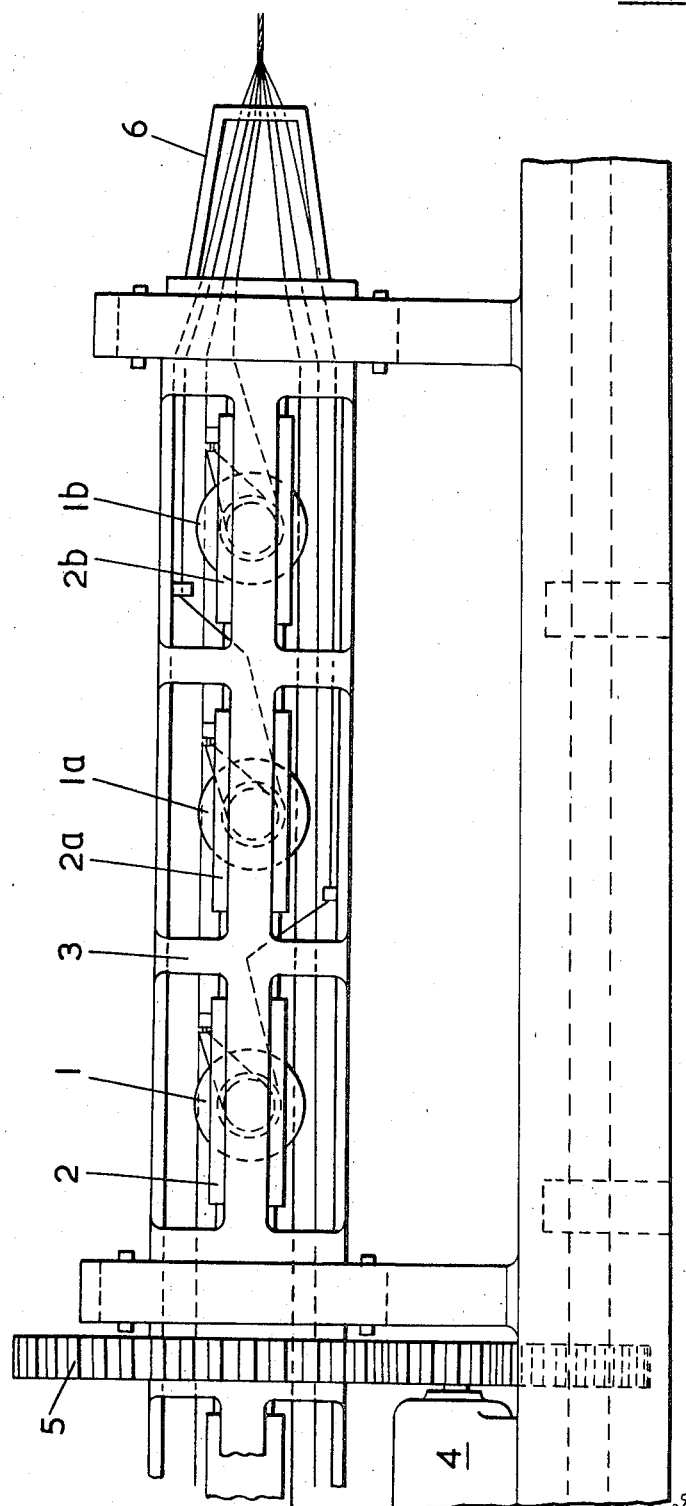
FIGURE 1 is a side elevation of an orthodox tubular stranding machine.

By extrusion, fluidisation, or other coating methods, a specified radial thickness of selected elastomer is applied to a patented (isothermally quenched and cold drawn) steel wire which, hereafter, will be referred to as the "king" wire.

The king wire—of requisite diameter to comply with the strand design specification, and coated with the desired radial thickness of the selected elastomer—is wound on to a bobbin 1 and inserted into the appropriate cradle 2 normally at the extreme rear of the machine. It is then threaded through the centre of the strander, via fairleads and the centre hole in the lay plate 6 to the forming point 12.

The specified number, and size, of steel wires required to form the overlying cover or covers are, in turn, wound onto bobbins 1a, 1b, etc., and inserted into their respective cradles, 2a, 2b etc., in the strander. Then, in like manner to the king wire, they are threaded through fairleads located along the internal periphery of the tube 3 to the forming point.

The tube is driven from a motor 4 over gearing 5.

The individual wires are subsequently threaded through a series of annular dies and heating units, after which they are bound together with a serving and attached to a strap, or tail of strand, which itself is wrapped several times around a surge wheel or capstan 26 and then attached to the barrel of a coiling drum or take-off reel 27. The reason for the lapping around the surge wheel is to provide linear traction when the machine is set in motion.

Apart from the special apparatus located at, or subsequent to, the forming point, the equipment and manner of setting up is well known to, and understood by, those versed in the art.

The aforementioned apparatus and modifications needed to operate the invention are now described in detail:

The orthodox lay plate 6 is modified by fitting a bearing 6a in its centre which permits the insertion of a spring 8 loaded conical nose piece 7.

The wires forming the strand cover pass through the fairleads 6b in the lay plate, and are then fed through the appropriate holes in the nose piece 7; whilst the king wire passes through the centre the outer wires emerge at that point where the nose of the cone is cut away to form slots which, in depth, are approximately one-third of the wire diameter. The profile of this slotted section may be either conical (FIGURE 3, item 7a) or spherical (FIGURE 4, item 7b).

By adjusting the nut 6c (FIGURE 3) the position of the nose cone can be moved so that the cover wires, as they emerge from the slotted area, can make intimate contact with the entry radius of the forming die 13. By this means it is possible to exert a constant, and equal tension, as well as pressure, on each of the cover wires.

Furthermore, because the keyway 6d causes the conic nose piece to rotate at the same speed as the lay plate, the wires are fully supported right up to the point of forming—the forming operation being carried out at a prescribed speed.

The forming die itself 13 is also made to rotate at the same speed, by means of the projecting fins 7c or like manner, on the nose piece; these fit into the slotted recesses in the die casing, and so transmit the requisite synchronous rotary power to the forming die, permitting the cover wires to be held in their prescribed positions whilst they embed themselves into the elastomeric covered king wire.

Thus, the specific advantages, achieved by using the conic nose piece, are:

(1) The cover wires are held in their designed positions right up to the moment of forming.

(2) A compensation for any lack of consistency in the braking force applied to the bobbins in the strander tube; these are normally band brakes of limited efficiency.

(3) Transmissions of power from the strander tube to the forming die, at the same speed and direction of rotation, via the fins.

The actual forming operation can be facilitated by supplying a flow of heated air to the combination of steel and elastomeric filaments as they converge over the cover nose piece 7, towards the forming point proper, and can readily be accomplished by placing around the conic nose piece an insulating casing which is fed from a blower fitted with an electric heater in the exit tube.

By this means the filaments maintain their requisite positions right up to the forming point and during the actual forming operation.

The rotary forming die itself, which can be made from polished hardened steel or polished tungsten carbide, and the profile based on orthodox design principles (FIGURE 3) or the toroid ring die principle (FIGURE 4) is housed in a ball bearing 10 and thrust race 11 which, in turn, is secured in a suitably designed housing or bracket 9 (FIGURE 2) capable of forward or backward horizontal traverse along two parallel bars 28 to permit its correct location at the forming point.

Electric heating elements 14 of the resistance, dielectric or copper induction type, are built in as an integral part of the apparatus. The whole is surrounded by an insulated casing (not shown) so that it may be thermostatically maintained at a specified temperature indicated on recording thermocouple 14a.

Figure 6:
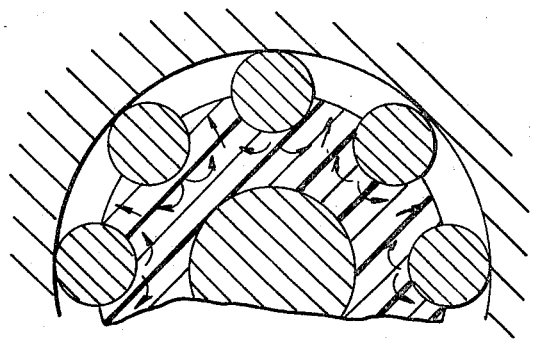

Immediately after the strand has passed through the forming die, its cross-section will closely resemble that shown in FIGURE 6, and, in order to completely fill all the internal voids with elastomer and bed the steel wires to their assigned positions, one or more heated annular reducing means 15 is applied.

Die 15 is shown with heater 16 in a frame 17 and with thermocouple 16a and is also adjustable in position along bars 28.

The internal bore of the second die 15 is some 8% to 30% less than that of the reducing means at the forming point 12, and the temperature of this die is maintained some 65/100 deg. cent. higher to permit complete embedding of the steel wires in the manner prescribed by the particular design specification.

Figure 2:
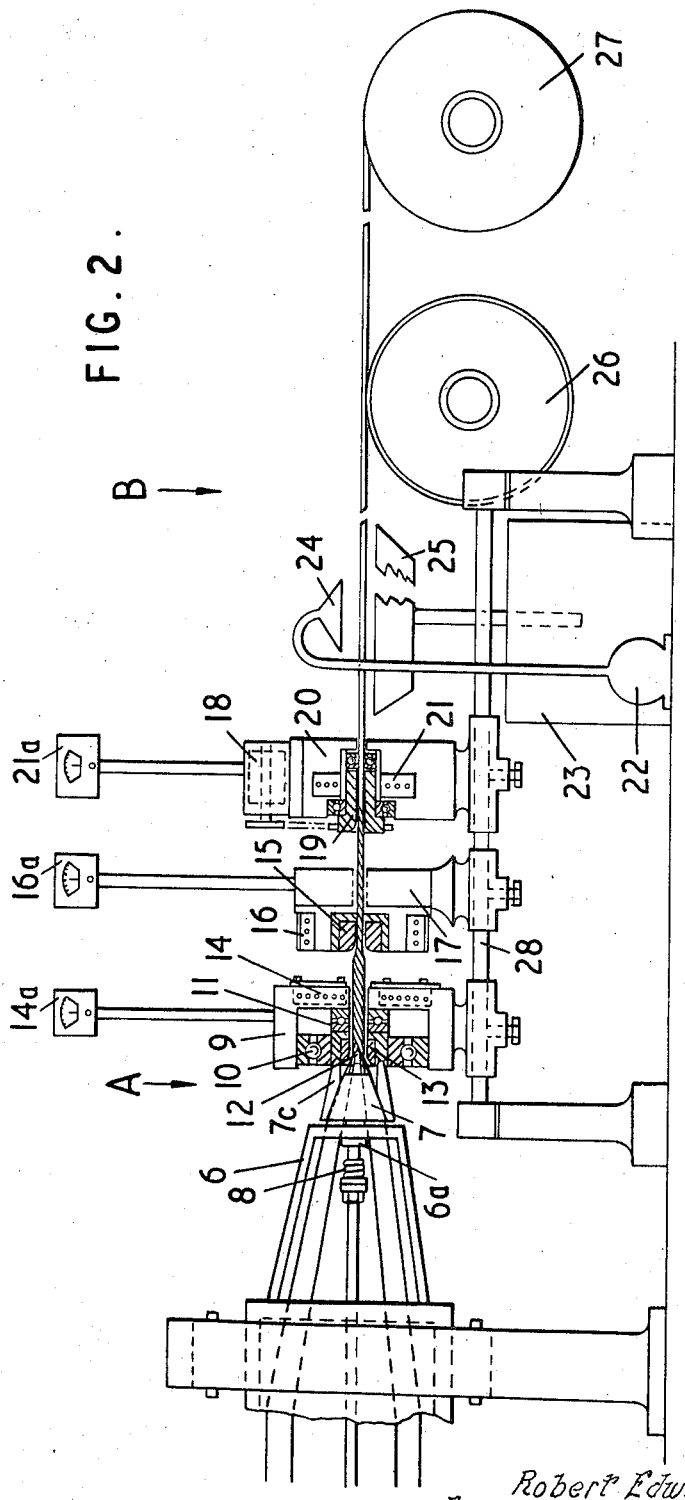
FIGURE 2 is a side elevation in partial section of equipment following the stranding machine for carrying out the method of the invention.

The arrangement shown in FIGURE 2, whereby the die 13 is made to rotate whilst the die 15 is stationary, may be considered as the preferred apparatus because it affords the maximum amount of operational flexibility. However, if desired, the two dies may be combined, and a single die employed; this should posses a relatively large bell mouth or entry radius, followed by a progressive reduction in diameter to the requisite bore, in turn followed by a parallel land, the length of which is at least ten times that of the die bore at its *minimum* diameter. A die of such a design is shown in FIGURE 3B but does not imply any limitation in respect of die, contour and mergent angles therein.

When it is desired to sheath the strand with a specific radial thickness of elastomer, a further coating die is located immediately after the reduction die, or dies.

The unit comprises a hardened steel, or tungsten carbide, die 19, having a long axial bore and is fitted into a ball bearing and thrust race, again secured in a suitably-designed housing 20 adjustably positioned on bars 28 (FIGURE 2).

The die proper has a sprocket attached to a flange on the entry face of the die casing, and is driven at any desired speed by means of the electric motor 18.

Once more, electric heaters 21 of the resistance, dielectric, or copper induction type are incorporated into the bracket, and these are maintained at a temperature consistent with that of the strand itself when it attains the extrusion temperature of the selected elastomer and indicated on recording thermocouple 21a.

When employing the coating die it is necessary to reduce the temperature of the elastomer to ambient before the coated strand passes on to the surge wheel 26, otherwise the sheathing will be distorted and the adjacent laps of strand adhere to one another. To achieve the reduction in temperature and circumvent distortion of the sheathing, cold water containing an antiadhesion agent is circulated from the tank 23 by the centrifugal pump 22, via the nozzle 24, returning to the tank via the trough 25.

The prescribed number of wires forming the "cover" over the king wire are caused to adopt the specified helix at a specific position 12, commonly referred to as the "forming" point.

Figure 5:
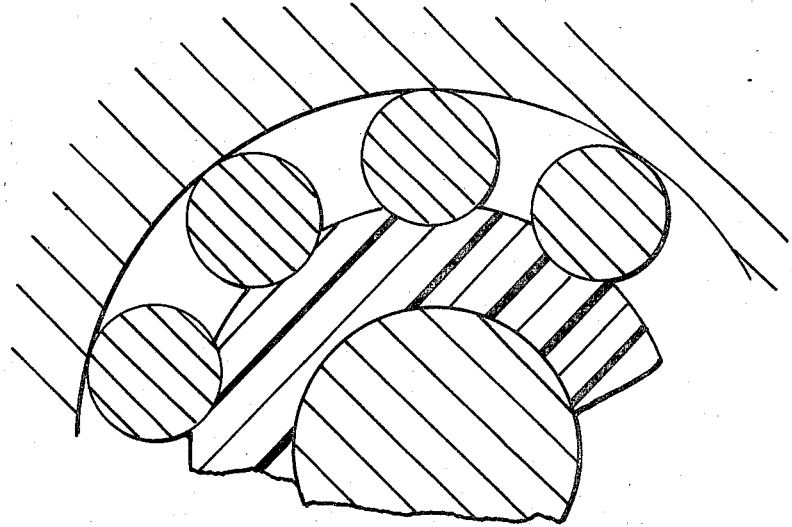
FIGURES 5 to 7 represent successive cross-sections of the strand during its progress through the annular reducing means.

If the strand as it forms is subjected to radial compression, and, at the same time, heated to the softening point of the elastomer, the wires forming the outer layer or cover will take up an assigned position around the circumference of the sheathed king wire, equidistant from one another, forming a series of concave indentations at the point of contact between each cover wire and the elastomer overlying the king wire, see FIGURE 5.

By maintaining the temperature of the strand at a specified figure, and increasing the circumferential pressure by means of an annular reducing means behind the forming point, the cover wires are further compressed in their assigned positions and commence to sink into the elastomer. As a result, the elastomer underlying each wire is laterally displaced and commences to diffuse and flow through the interstitial gaps and voids towards the surface of the strand, see FIGURE 6, where it is finally contained by the internal wall of the reducing means see FIGURE 7.

Figure 8:
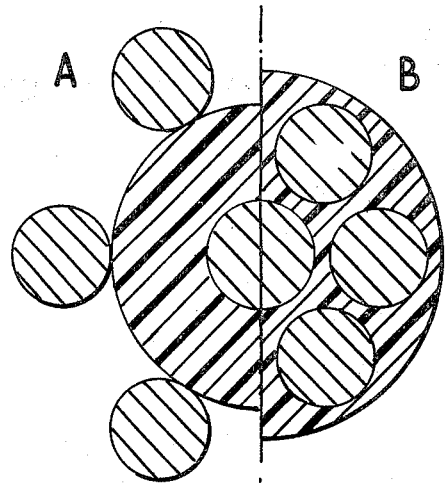
FIGURES 8 to 30 represent cross-sections of strand as they would occur before reaching the forming point A and after processing according to the invention, B.

In this example, the radial thickness of elastomer applied to the king wire was calculated to fill the internal voids within the strand, and no more. However, by increasing the radial thickness of the elastomer on the king wire, and causing the strand to pass through a third, heated, annular device possessing a long land, or axial bore the diameter of which is equal to that of the strand diameter plus the specified radial thickness of the elastomer, it is possible to produce a continuous radial layer, or sheathing, around the strand. This is achieved by heating the strand to the extrusion temperature of the plastic, whereby the excess elastomer which has exuded to the strand surface flow to form the continuous sheathing, see FIGURE 8.

Point A indicates that stage at which the strand components are brought together, and point B indicates that stage at which the cover wires have attained their final positions in the strand.

In each of the cross-sectional drawings relative to this method, those figures marked A and B refer to these particular stages of operation.

The foregoing has demonstrated how, by providing an integral source of elastomer within a strand, and applying heat and pressure, it is posible to achieve control over the ultimate position of the wires within the strand.

A third factor, namely, axial tension, makes it possible to exercise further control.

For example, under the influence of radial pressure alone, it has been demonstrated that a single layer of wires can be made to form concave seatings where they make contact with the elastomer—see FIGURE 5.

Figure 7:
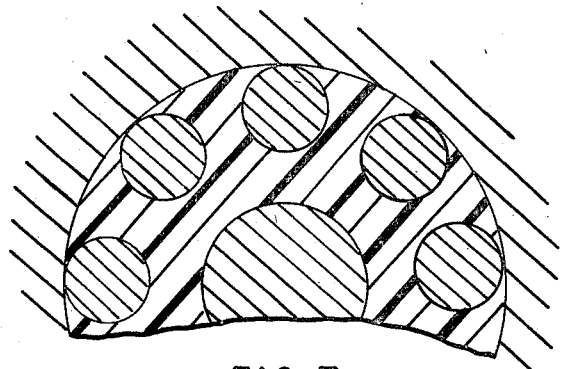

By applying heat, the depth to which the wires can be made to sink into the elastomer, and the speed with which this is achieved, is increased until the point is reached where the elastomer is level with the crown of the outer wires, see FIGURE 7.

Figure 9:
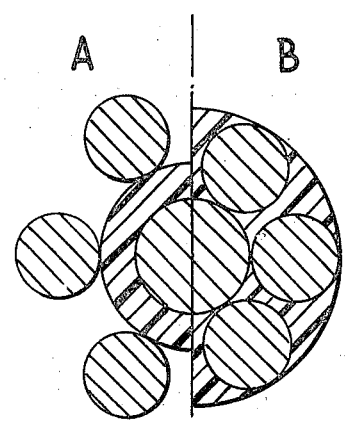
Figure 10:
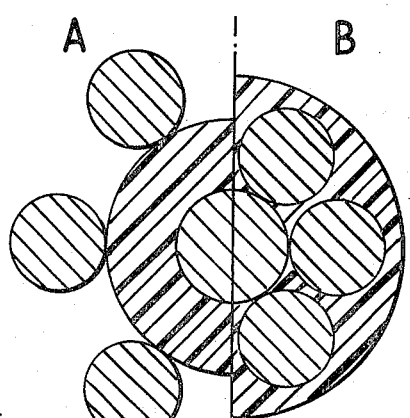

So, by applying a prescribed amount of tension, the outer wires can be induced to move inwards until they are completely embedded, but not in physical contact with the king wire, although, if taken to the ultimate, point contact could be achieved, see FIGURES 9 and 10.

If the machine is operated at relatively low rotational speed and linear throughput in making small diameter strands of simple construction, e.g. 6 x 6/1, the invention can be performed with the apparatus illustrated in FIGURES 1–2, whilst omitting items 7, 7a and 7b, but retaining the lay plate 6. However, items 7, 7a and 7b are an important part of the equipment when strands in excess of approximately ⅛" (0.130) diameter, are processed at commercially economic speeds, largely due to the necessity of preventing centrifugal effects and "flutter" of the filaments just prior to forming. In addition, there is the need to create a controlled amount of tension in the larger sized filaments whilst they are formed into a strand.

Figure 3:
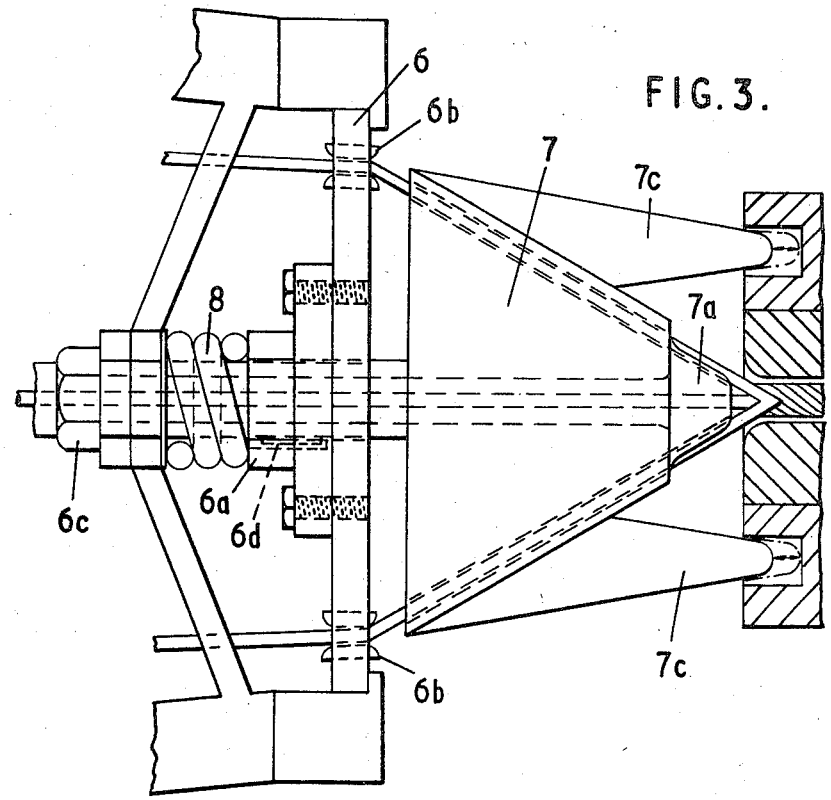
FIGURE 3 is an enlarged view of part of FIGURE 2.
Figure 4:
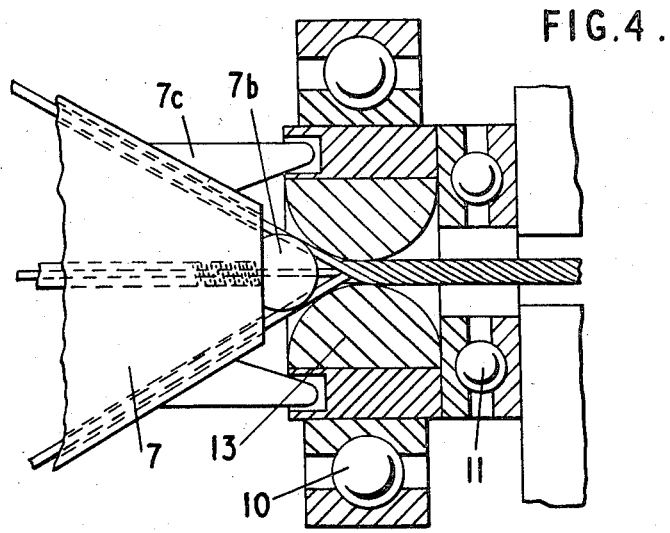
FIGURE 4 is a view corresponding to FIGURE 3 of a modification.

Omission of the unit illustrated in FIGURES 3–4, would of course necessitate the introduction of a motor drive to the die 13, FIGURE 2, in the same manner as shown at the third die 19.

Figure 11:
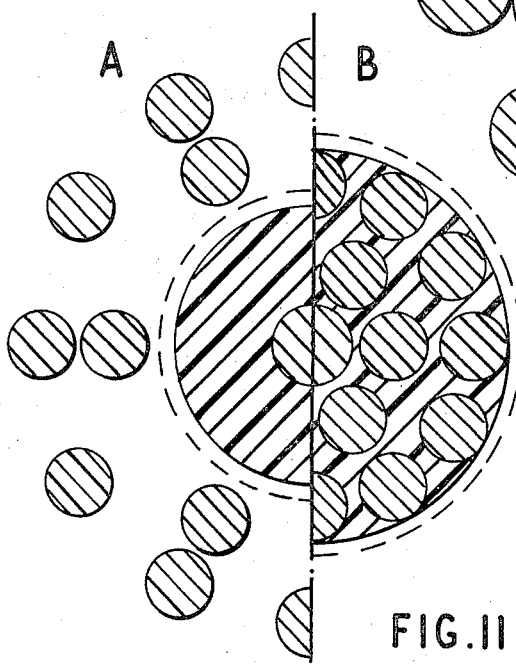
Figure 12:
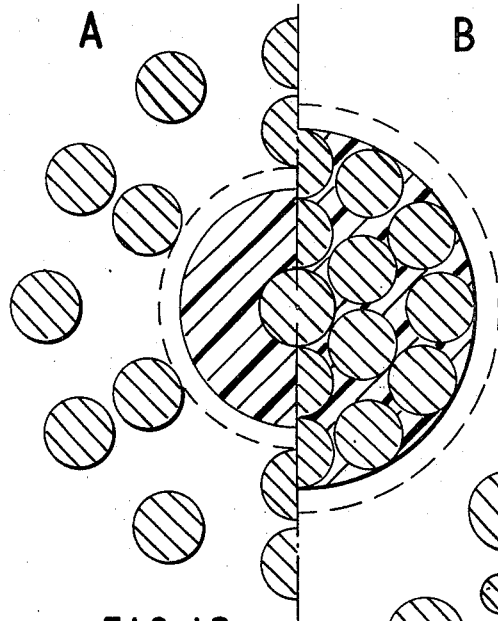

Consideration has, to this stage, only been given to a single cover but, if a second cover were applied as an integral part of the initial spinning operation, the same fundamental concepts would apply—see FIGURES 11 and 12. The increased radial thickness of elastomer required to provide overall sheathing of the finished strand is indicated by broken lines.

Figure 13:
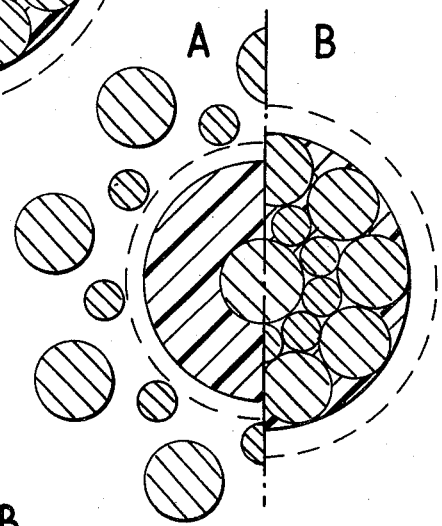
Figure 14:
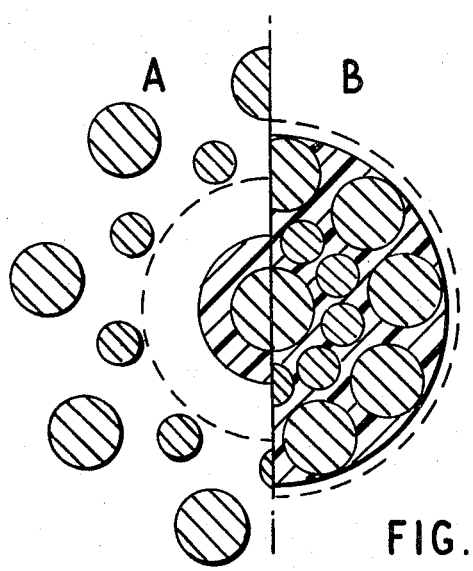

Further permutations, in respect of additional covers, are permissible, including the "seale" constructions—see FIGURES 13 and 14. Again, the increased radial thickness of elastomer required to provide overall sheathing of the finished strand is indicated by broken lines.

The radial thickness of elastomer deposited upon the king wire would, of course, be proportional to the extra fill factor space created by the additional covers.

The technical advantages accruing from the employment of the method disclosed, over existent methods are:

(a) Its employment on existing stranding equipment, as a complete operation, effecting a considerable saving in labour and handling costs.

(b) Complete impregnation of the strand at the outset, because the selected elastomer is placed centrally within the strand at the time of processing, and the wires fully embedded. Thus is circumvented the danger of voids and cavities which arise when employing the impregnation technique from the circumference of a finished strand.

(c) There is no adhesion of the steel wires to the elastomer, despite their being completely embedded, consequently, they are able to move without hinderance, which results in the strand retaining its flexibility.

(d) Complete encasement of the steel wires results in improved fatigue performance, due to the elimination of interwire friction, a factor which is further enhanced if the selected elastomer naturally possesses anti-friction characteristics, or has such agents intentionally compounded into it.

(e) In those examples where the elastomer is caused to form an external sheathing, the steel wires are fully protected against normal corrosive agents.

Figure 15:
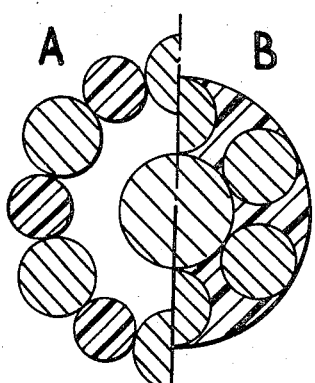

If in the construction shown in FIGURE 2 the coned member 7 is removed and a combination of wire and elastomer filaments are used in the stranding operation, then a construction as shown in FIGURE 15 is obtained.

Figure 16:
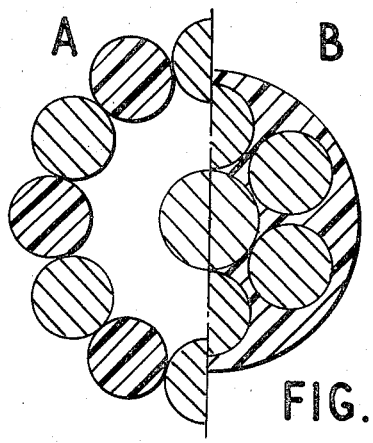
Figure 17:
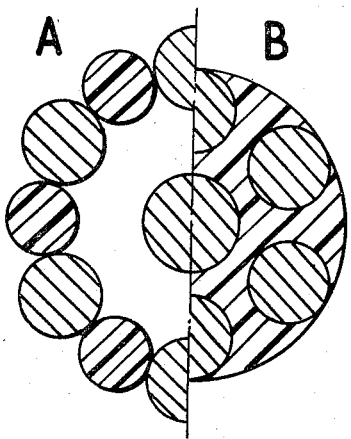
Figure 18:
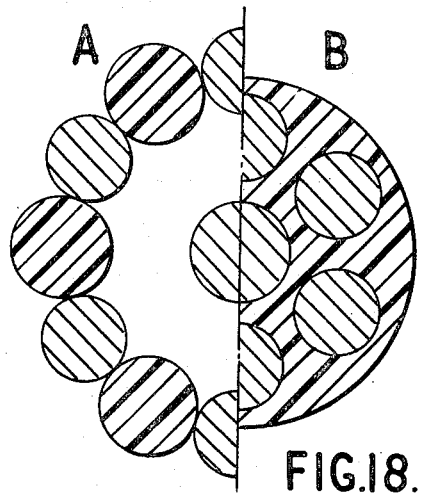

Thus, alternate elastomeric monofilaments and steel wires may be used in the cover. FIGURE 15 illustrates the effect of the sole application of heat and pressure, in which the cover wires are fully supported by the king wire. FIGURE 16 illustrates the same procedure as FIGURE 15 but utilises larger diameter synthetic monofilaments to produce the external layer of elastomer. FIGURE 17 illustrates the use of heat with a lesser degree of cross-sectional reduction, and a minimum of tension. FIGURE 18 illustrates the same procedure as FIGURE 17 but utilises larger diameter synthetic monofilaments to produce the external layer of elastomer.

Figure 19:
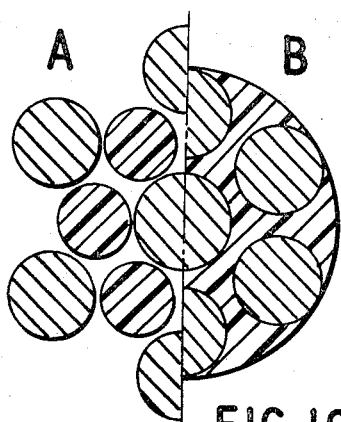

Another method would be to spin alternate layers, or covers, composed entirely of elastomeric monofilaments or steel wires. FIGURE 19 illustrates a construction using one layer of elastomer filaments with a layer of steel wires superimposed.

Whichever constructional method is employed the final result is the same, in that the steel wires are embedded—in the prescribed positions—in a matrix of elastomer or elastomers.

Various combinations of the techniques of alternate filaments in a cover and alternate covers of the respective types of filaments may be used.

Figure 20:
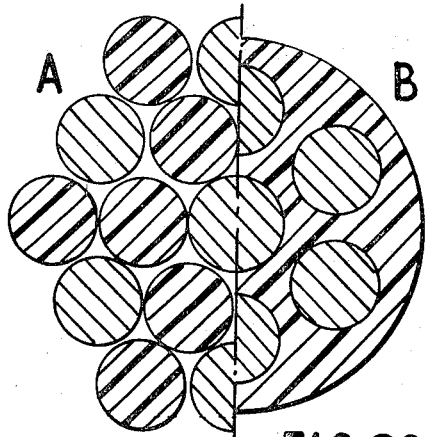
Figure 21:
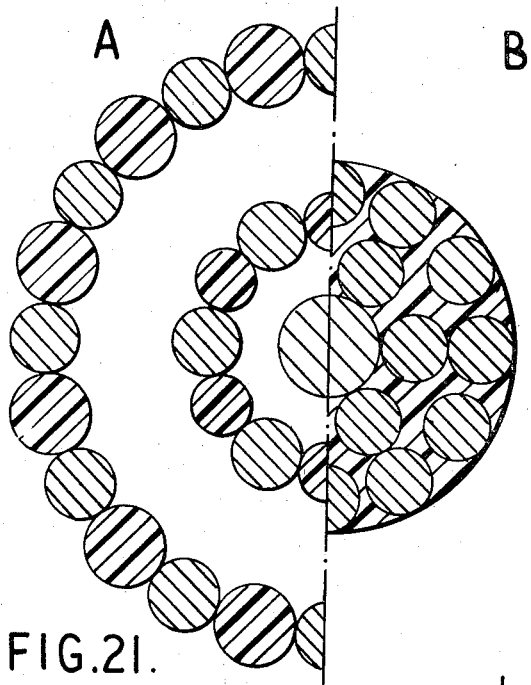
Figure 22:
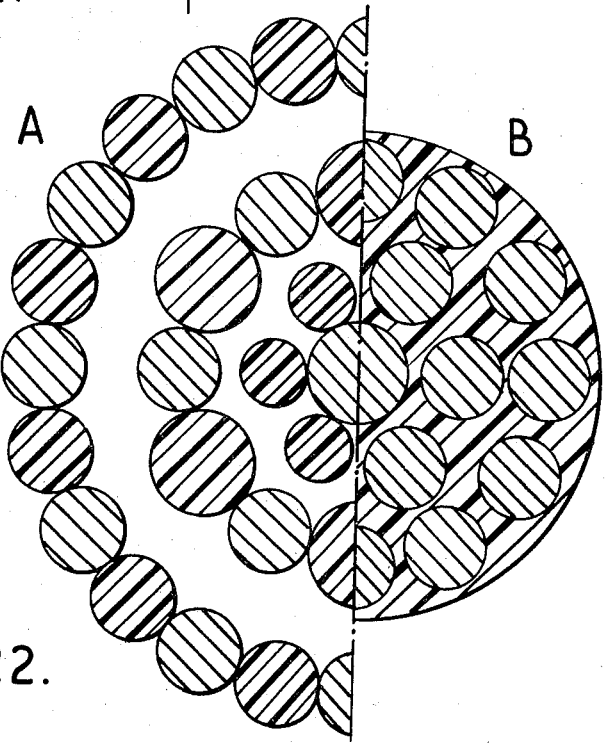

Thus, utilising a simple dual cover construction, each of alternate filaments, a typical example appears in FIGURES 20 and 21 which show the cross-section at the time of forming and after the invention has been applied. In FIGURE 22 a cover of elastomeric monofilaments is covered by two successive covers each of alternate elastomeric filaments and steel wires.

Figure 23:
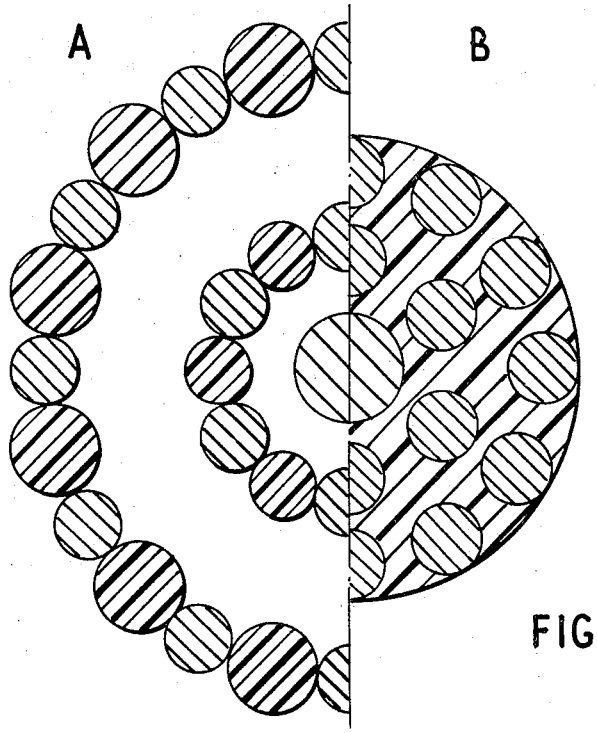
Figure 24:
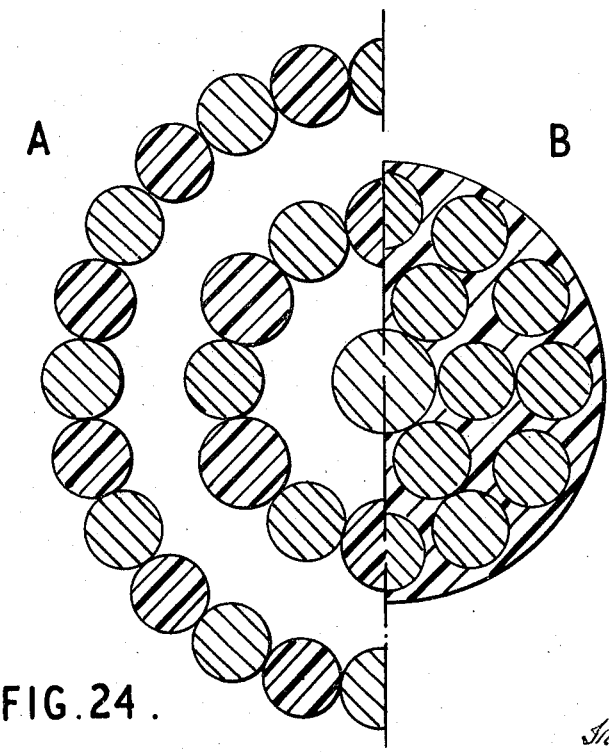
Figure 25:
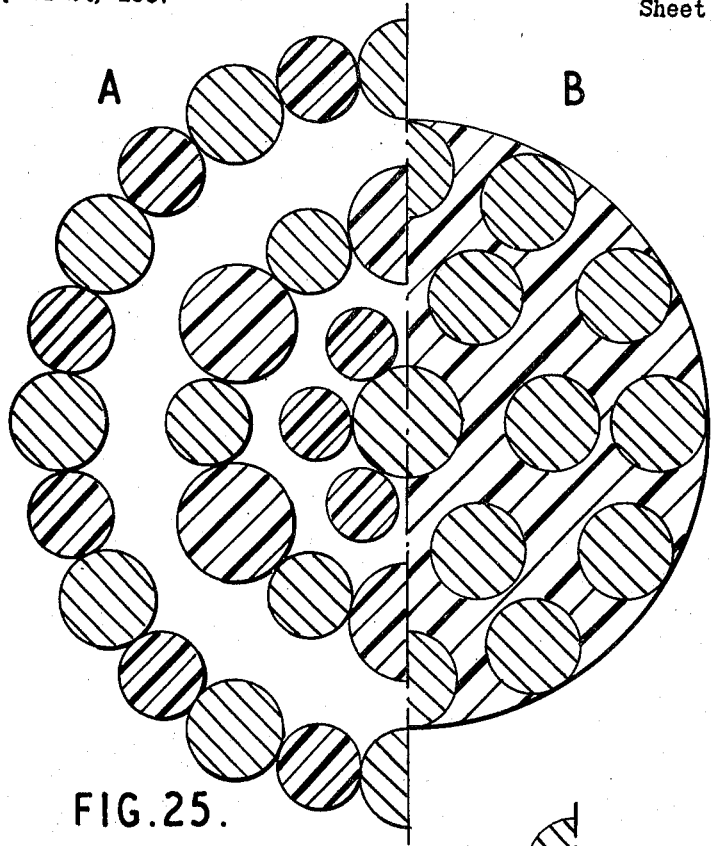

Various other typical alternative constructions are illustrated in FIGURES 23 to 25.

Figure 26:
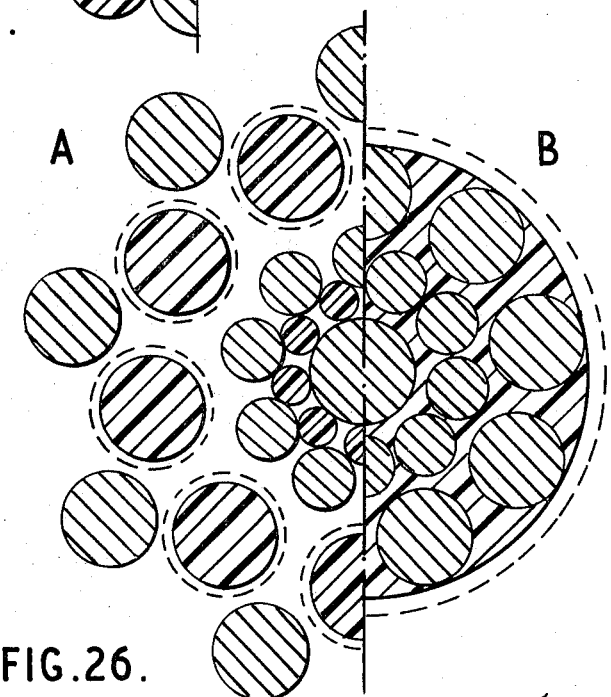

FIGURE 26 illustrates specifically the seale construction. The larger diameter synthetic monofilaments, required to provide an external sheathing to the strand, are shown by the broken lines.

Figure 27:
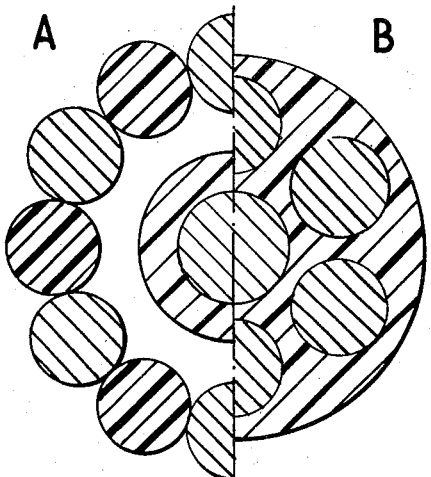
Figure 28:
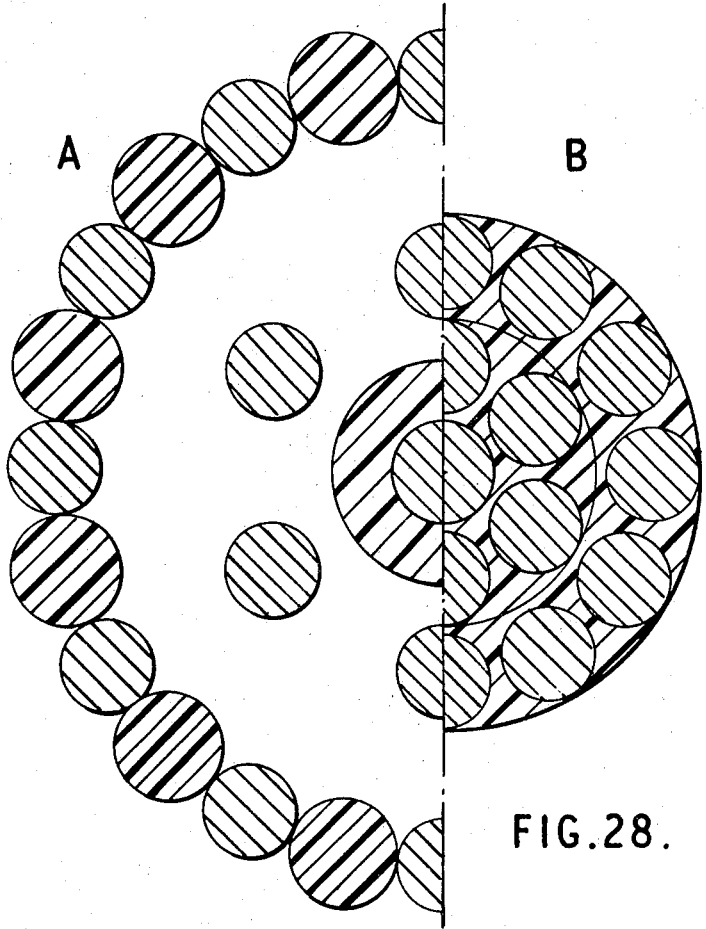

Furthermore, it should be noted that, purely as circumstances dictate, a plastic coated king wire may be incorporated in the manner previously described, see FIGURES 27 and 28.

The technical advantages accruing from the use of combinations of elastomeric monofilaments or steel wires are:

(a) Any number of covers, within the capacity of a particular stranding machine, can be employed, yet the steel wires are retained in the positions prescribed by the design specification.

Figure 29:
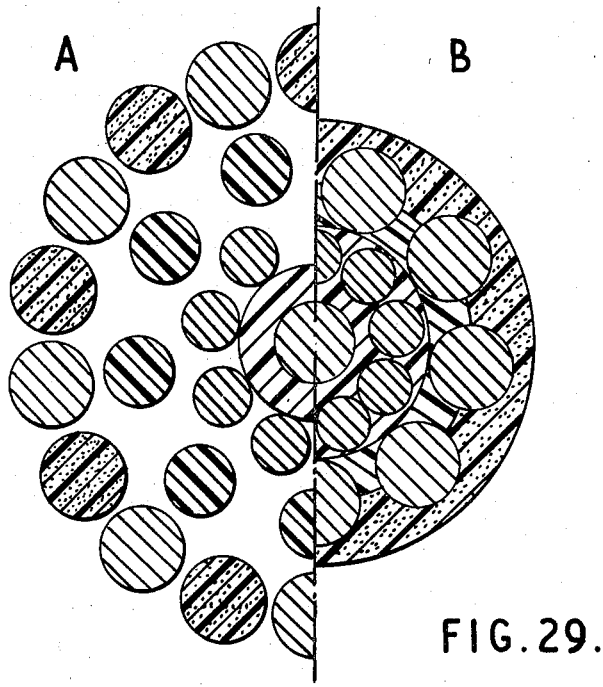

(b) More than one type of elastomer can be incorporated into the strand at one and the same time. For example: The king wire may be coated with soft, and easily deformed, elastomer—e.g. P.V.C. or polyethylene. Each subsequent alternative cover, or the alternate monofilaments in each cover, may be of high density polyethylene, whilst the penultimate or final cover may comprise elastomeric monofilaments containing the dispersion of a metal, or its oxide, see FIGURE 29.

(c) Strands so composed are in a suitable condition for the application of an external sheath, which can be homogeneously bonded with the underlying elastomer.

Figure 30:
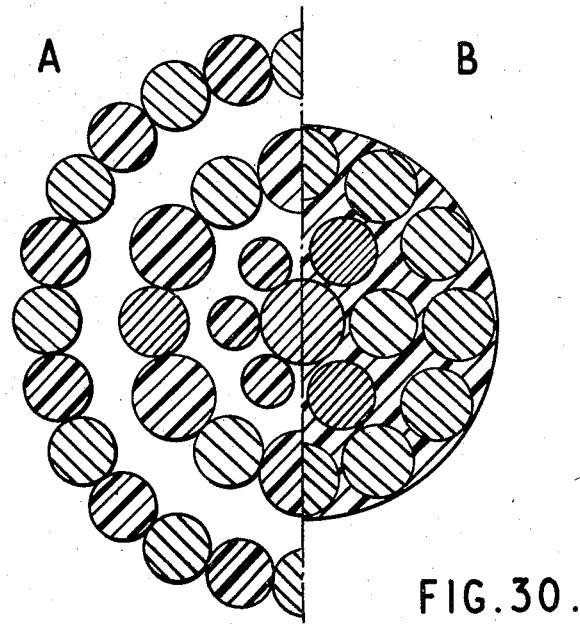

(d) A strand, or a rope formed from a number of strands, may have copper or aluminum conductors substituted for one or more of the steel wires, to permit the incorporation of electrical circuitry as an integral part of its construction and, in such instances, the king wire or wires may, if desired, be made from copper also, to act as return conductor. See FIGURE 30.

The methods of the invention may also be used for the manufacture of ropes based on the locked coil principle, that is, where the rope comprises one large strand produced by spinning successive layers as single, separate, step by step, operations.

Figure 31:
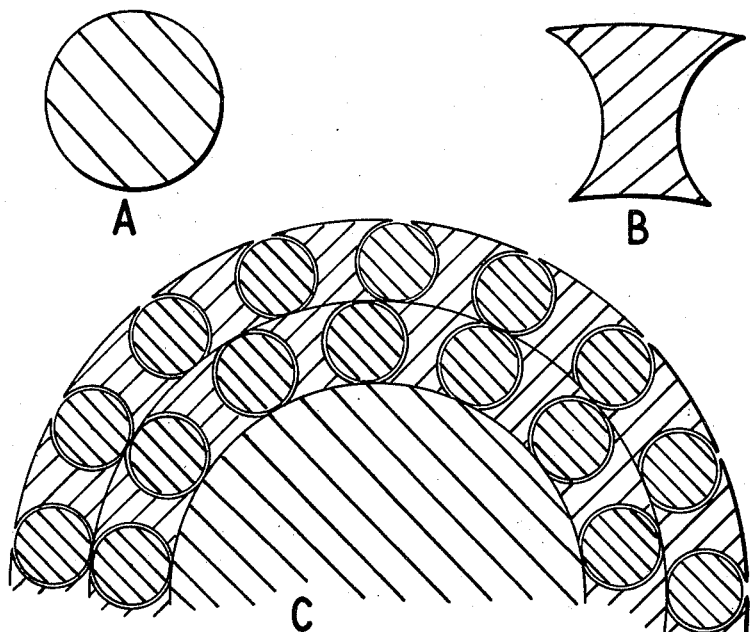
FIGURE 31 represents at A a section of a round steel wire and at B a section of the shape of the spacing wires used in lock-coil construction and at C a cross-section of a typical locked coil strand.

Such ropes, when composed entirely of steel, are made by spinning together cold drawn, carbon steel wires, the cross-section of the alternate wires in specific covers being round and H-shaped respectively (see FIGURES 31A, 31B and 31C), so that they interlock. A rope of this type is the nearest known approach to a solid steel bar capable of repeated flexion, which at the same time, possesses the highest tensile strength for a given cross-sectional area.

When ropes of this nature are exposed to corrosive conditions and subjected to dynamic loading, they present difficulties in the attainment of full corrosion protection and the maintenance of complete internal lubrication.

Therefore, despite the inevitable loss of some tensile strength, problems relative to corrosion and lubrication are met by substituting elastomeric monofilaments for the H-shaped wires, followed by traversing the rope, at each stage, through a heated annular drawing or compacting device.

Figure 32:
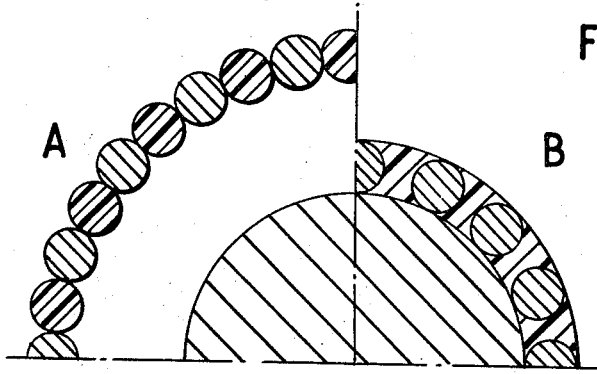
FIGURES 32 to 37 represent cross-sections of lock-coil strands made according to the invention before reaching the forming point A and after processing B.
Figure 33:
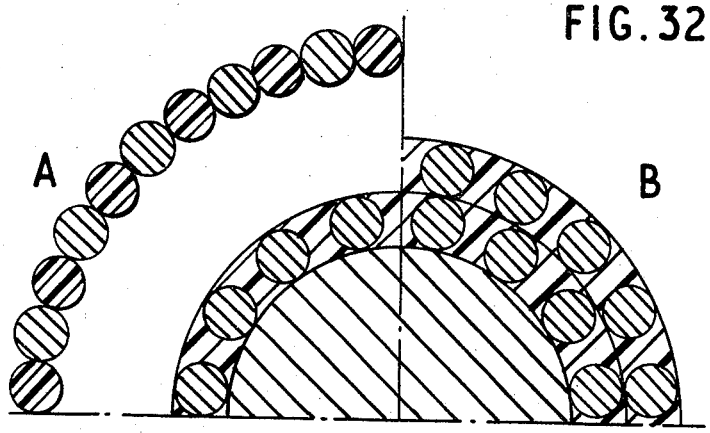

Cross-sections of locked-coil rope made according to the invention are shown in FIGURES 32 and 33 and represent the application of some of the intermediate covers at the forming point, as the rope passes through the reducing means.

Elastomer filaments of circular section will be used but these will tend to be deformed elastically initially—towards the well known half-lock shape.

The degree of compression required to effect flow of the elastomer under the conditions of temperature and tension applied will be very much less in this example than when using filaments of circular section.

Figure 34:
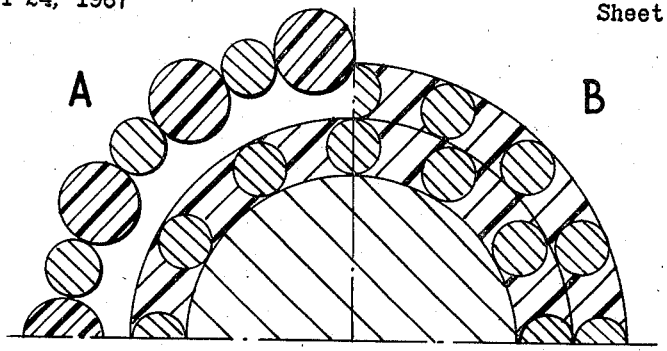

The locked coil method is capable of being applied in several ways:

(1) The units comprising the cover, i.e., alternate round sections of steel and elastomer, are spun into position, the elastomeric filaments being larger, by a calculated margin (see FIGURE 34), so that, when subjected to heat and compression, the elastomer will be displaced to become level with the crowns of the adjacent steel wires. See FIGURE 34B.

Figure 35:
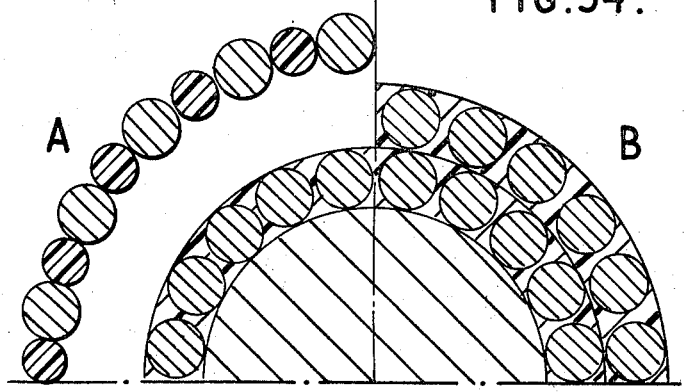

(2) A deviation from this basic concept would be to adjust the size of the monofilaments so that the gap between the steel wires, after compaction, is such as to merely maintain a thin film of elastomer rather than an appreciable cubic volume. Thus, a large proportion of the tensile strength—as designed—would be retained. See FIGURE 35.

Figure 36:
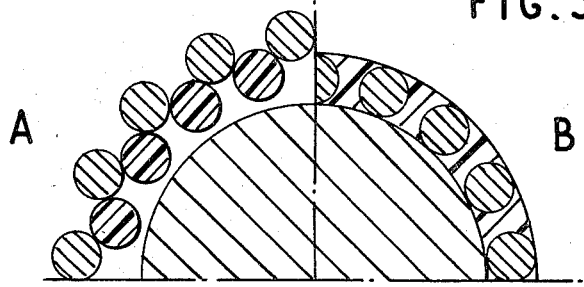

(3) Two covers are laid at one and the same time, the first being composed entirely of elastomeric monofilaments, the second entirely of steel wires, which are so spaced that they lie in the interstices of the elastomeric monofilaments. See FIGURE 36A. When subjected to heat and compression, the steel wires sink through the elastomer and form a single cover, as illustrated in FIGURE 36B.

Figure 37:
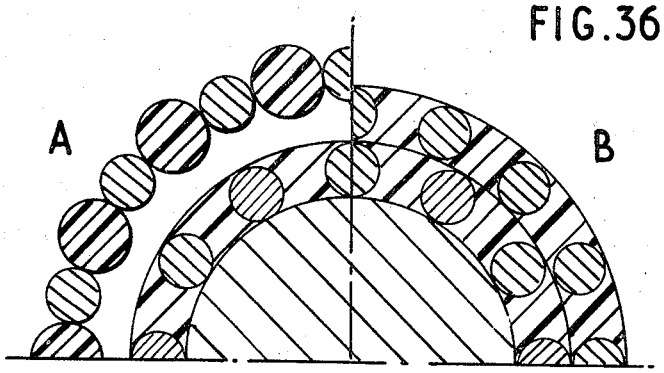
Figure 38:
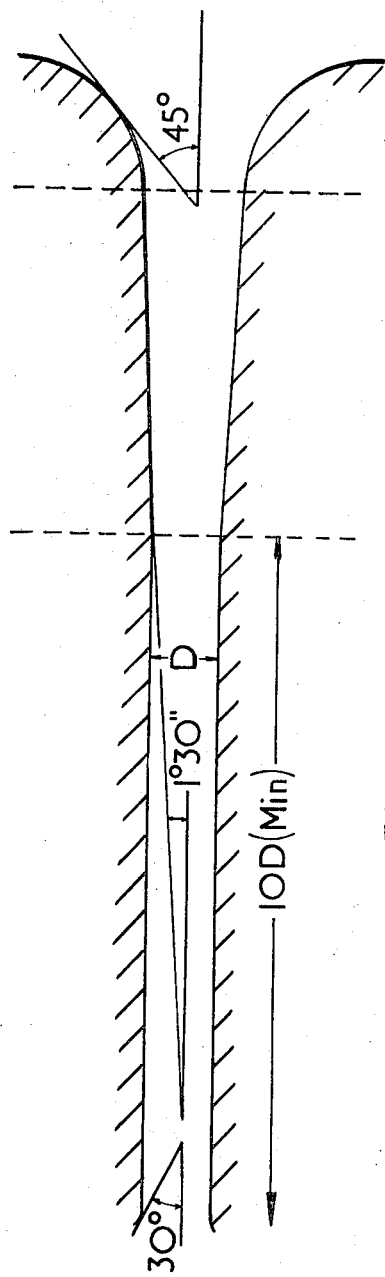
FIGURE 38 is a cross-section of a combined die.

Whichever of the methods is employed, it is posible to use one type of elastomer throughout the rope, or, if technical considerations make it advisable, different elastomers can be incorporated into one or more covers as desired. Copper or alumium conductors may also be incorporated into this construction. See, as an example, FIGURE 37.

The various drawings of strand sections merely illustrate typical examples and many permutations within the basic concept are possible.

The invention for which protection is requested, overcome the product deficiencies mentioned earlier because the basic concept appertaining to the teachings disclosed lies in the fact that a selected elastomer, or combination of elastomers, can be incorporated into the design of a steel wire core, strand, or rope, with the same calculated precision as can the steel wire components in the desired construction. If the resultant product is examined in cross-section, it will be observed that the dimensional relationship and orientation of the materials strictly conform to the originally specified design dimensions and geometry.

The ability to achieve this desired relationship offers production, technical and operating advantages in respect of cores, strands, and ropes, which is not achieved by the more orthodox means.

The validity of this disclosure may be observed if a core, strand, or rope, made according to the invention is examined in respect to the following points:

(7) The interstitial gaps between the steel wires, as these are completely filled with a selected elastomer, and the said gaps show mathematical uniformity in spacing and contour.

(2) The external sheathing of a core, strand, or rope, as this will be found to possess a uniform radial thickness and, at the same time, form a completely homogeneous bond with the internal elastomer. This applies even in those instances where a proportion of the internal elastomer varies in composition from that of the external sheathing.

(3) The external sheathing in those instances where it is not bonded to the underlying steel wires of the outer layer, but intimately bonded to the plastic in the "interstices."

It will also be observed that although the component steel wires are in intimate contact with the surounding elastomer, they are in no way bonded to it, hence the finished product remains flexible, and free to function in the manner prescribed by the design specification.

While the techniques of the invention have been described more especially in relation to the formation of strand and of locked coil ropes, it will be understood that they may also be applied to the formation of ropes from a plurality of strands whether the strands are formed according to the invention or not.

It will be understood that the number and size of steel and/or elastomeric filaments employed in any one cover, or in the overall strand construction, may exceed or fall below those illustrated in accordance with design requirement.

I claim:

1. A wire rope, in which the wires in the same layer at least, are not in physical contact with each other but are separated by a physical filamentary elastomeric material which is deformed to completely fill the interstices between the wires without loss of individual identity of said elastomeric material.

2. A wire rope, as claimed in claim 1, comprising a plurality of layers in which the adjacent wires in different layers are separted by an elastomeric material.

3. A method of forming a strand in which a strand is first formed from a mixture of metal filamentary components and filamentary components of elastomer, and the strand is then drawn through a sizing or compacting means such as a die, while being subjected to tension, heat and radial pressure, the degree of temperature corresponding to the softening point of the elastomer whereby the interstitial spaces between the filamentary components are filled by plastic flow of the elastomer.

4. A method as claimed in claim 3 in which the flow of elastomer provides a sheath around the strand continuous with the interior elastomer.

5. A method as claimed in claim 3 in which an elastomeric sheath is applied subsequently bonding to the interior elastomer.

6. A method as claimed in claim 3 in which the filamentary components of elastomer have a wire running therethrough.

7. A method of forming a strand in which around a central king wire sheathed with elastomer is helically wound a layer of wires in opposed apart positions, the strand is then passed through a die means to cause the elastomer to flow between and around the wires in the layer of wires.

8. A method as claimed in claim 7 in which the strand thus formed sheathed with elastomer is used as the king wire for a further operation of the method.

9. A method of multi-cover stranding in which alternate filaments of wire and synthetic elastomer are used in each cover and the strand formed is heat compacted to cause the elastomer filaments to flow and fill the interstices between the wires.

10. A method as claimed in claim 9 in which the covering is effected layer by layer.

11. A method as claimed in claim 9 in which the elastomer filaments are initially of half lock section.

References Cited

UNITED STATES PATENTS

| 2,067,405 | 1/1937 | Mayne | 57—166 XR |
|---|---|---|---|
| 2,181,475 | 11/1939 | Bourdon | 57—162 XR |
| 2,427,507 | 9/1947 | Powell et al. | 57—164 XR |
| 3,018,607 | 1/1962 | Dietz et al. | 57—161 XR |
| 3,064,414 | 11/1962 | Kiyoshi Ando | 57—162 |
| 3,106,815 | 10/1963 | Nance et al. | 57—161 XR |
| 3,188,791 | 6/1965 | Grimes et al. | 57—161 XR |
| 3,318,082 | 5/1967 | Riggs | 57—162 XR |

STANLEY N. GILREATH, Primary Examiner.

W. H. SCHROEDER, Assistant Examiner.

U.S. Cl. X.R.

57—149, 161, 162